Patented June 19, 1934

1,963,762

UNITED STATES PATENT OFFICE 1,963,762

PRODUCTION OF ARTIFICIAL MASSES

Wilhelm Pungs, Karl Eisenmann, and Erich Scholz, Ludwigshafen-on-the-Rhine, and Theodor Kollmann, Mannheim, Germany, assignors to I. G. Farbenindustrie Aktiengesellschaft, Frankfort-on-the-Main, Germany No Drawing. Application November 29, 1930, Serial No. 499,122. In Germany December 6, 1929

6 Claims. (Cl. 260—3)

The present invention relates to improvements in the production of artificial masses.

Solutions of condensation products from urea and/or thiourea with formaldehyde, or its polymers, in organic solvents may be prepared by direct condensation of the said components in hydroxyl-bearing organic solvents or mixtures tnereof with other solvents, or by employing the methylol compounds of urea or thiourea or mixtures of these, or the anhydride-like compounds obtainable from the methylol compounds by splitting off water, instead of the urea or thiourea, and formaldehyde. The properties of the resulting products, such as stability to water, solubility, behaviour to other substances and the like, are determined by the choice of the solvent employed for the condensation. Ethers of methylol ureas have been prepared according to the specification of the U. S. Patent No. 1,699,245, which ethers may be converted into resins or lacquers by polymerization in the presence of organic solvents.

We have now found that products of a new kind are obtained by carrying out the condensation of a urea and an aldehyde, preferably with the addition of a small amount of acid or alkaline condensing agents, in the presence of organic substances which contain at least one free hydroxyl group and also at least one reactive group, such as halogen, primary or secondary amino, carboxyl or additional hydroxyl groups, thereby preserving at least one reactive group, and the reactive groups still present then being wholly or partially converted with organic compounds capable of forming an oxygenated linkage with the said reactive group, such as alcoholates, phenols, phenolates, acid chlorides or anhydrides, salts of carboxylic acids or alkylene oxides. The choice of the last-mentioned substances depends on the desired properties of the condensation products, and the substances chosen for the conversion may also be simultaneously or subsequently brought into reaction with other reactive components so far as the products still contain reactive groups such as double linkages. It is possible in this manner to prepare condensation products which are different from the usual resinous condensation products of urea and formaldehyde, the properties of which as regards solubility in organic solvents, homogenization with other non-volatile substances, capability of being moulded by pressing, waterproof nature, fusibility and other physical properties may be adapted to the purpose for which the products are intended. Thus for example, fusible solid or oily products can be obtained as well as products resembling linoxyn or waxes, which, however, have not completely lost the resinous character of artificial resins. The condensation of a urea and an aldehyde is meant to include the condensation of a methylol urea or of an anhydride thereof, whereby about the same products are obtained as on working with a urea and aldehyde; in most cases the employment of a methylol urea will be preferred owing to the possibility of working with lower quantities of solvents.

Especially suitable agents containing at least one hydroxyl group and another reactive group are for example polyhydric alcohols, as for example ethylene glycol, di- or poly-ethylene glycol, glycerol, or their derivatives having at least one hydroxyl group and another reactive group such as monoalkyl or monoaryl ethers of glycerol, halogen substitution products, such as ethylene chlorhydrin, glycerol α-monochlorhydrin or α-β-dichlorhydrin, and esters of polyhydric alcohols with polybasic organic acids, as for example esters of phthalic, oxalic, succinic, adipic or tartaric acid of the type:

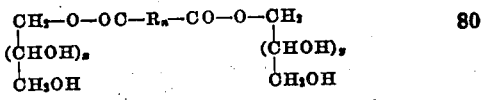

or esters of benzoic acid or other monobasic aromatic or aliphatic saturated or unsaturated acids with polyhydric alcohols corresponding to the general formula:

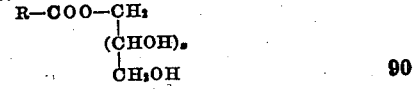

In these formulæ, R represents an aliphatic, cycloaliphatic or aromatic hydrocarbon radicle, $x$ and $y$ represent any whole numbers, and $n$ may be 0 or any whole numbers. Primary or secondary amines according to the aforesaid definition are the different alkylol amines as for example mono-, di- or tri-ethanol or propanol amines, N-ethanol aniline and the like.

The course of some specific reactions according to the present invention may be illustrated by the following formulæ. In order to facilitate comprehension of these formulæ, reference is made only to the monomeric monomethylol urea, it being, however, understood that the invention relates to polymerized mono- and di-methylol ureas. In the formulæ U denotes the radicle:

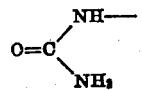

1. The condensation of monomethyl urea with glycol proceeds according to the formulæ:

U—CH₂—OH+HO—CH₂—CH₂—OH →
U—CH₂—O—CH₂—CH₂—OH

The latter compound may be reacted according to our invention
(a) with acetyl chloride:

U—CH₂—O—C₂H₄—OH+Cl—C—CH₃ →
                           ‖
                           O

U—CH₂—O—C₂H₄—O—C—CH₃
                ‖
                O to give an ester;
instead of acetyl chloride also acetic anhydride may be used;
(b) with sodium methylate:

U—CH₂—O—C₂H₄—OH+NaOCH₃ →
U—CH₂—O—C₂H₄—O—CH₃ to give an ether;
(c) with the acid methyl ester of oxalic acid:

U—CH₂—O—C₂H₄—OH+HO—C—C—O—CH₃ →
                     ‖ ‖
                     O O

U—CH₂—O—C₂H₄—O—C—C—O—CH₃
                ‖ ‖
                O O to give a di-ester;
(d) with glycol monoacetate:

U—CH₂—O—C₂H₄—OH+HO—CH₂—CH₂—O—C—CH₃ →
                                 ‖
                                 O

U—CH₂—O—C₂H₄—O—C₂H₄—O—C—CH₃
                       ‖
                       O to give an ester-ether.

2. The condensation of monomethylol urea with ethylenechlorhydrine proceeds according to the formula:

U—CH₂—OH+HO—H₂C—CH₂—Cl →
U—CH₂—O—CH₂—CH₂—Cl.

The latter compound may be reacted according to our invention
(a) with sodium acetate:

U—CH₂—O—C₂H₄—Cl+NaO—C—CH₃ →
                       ‖
                       O

U—CH₂—O—C₂H₄—O—C—CH₃
                ‖
                O to give an ester;
(b) with sodium methylate:

U—CH₂—O—C₂H₄—Cl+NaO—CH₃ →
U—CH₂—O—C₂H₄—O—CH₃ to give an ether;
(c) with the sodium salt of the acid methyl ester of oxalic acid U—CH₂—O—C₂H₄—Cl+NaO—C—C—O—CH₃ →
                      ‖ ‖
                      O O

U—CH₂—O—C₂H₄—O—C—C—O—CH₃
                ‖ ‖
                O O to give a di-ester;
(d) with glycol monoacetate:

U—CH₂—O—C₂H₄—Cl+HO—CH₂—CH₂—O—C—CH₃ →
                                 ‖
                                 O

U—CH₂—O—C₂H₄—O—C₂H₄—O—C—CH₃.
                       ‖
                       O

3. The condensation of monomethylol urea with monoethanolamine proceeds according to the formulæ:

U—CH₂—OH+OH—CH₂—CH₂—NH₂ →
U—CH₂—O—CH₂—CH₂—NH₂.

The latter compound may be reacted according to our invention
(a) with acetyl chloride:

U—CH₂—O—C₂H₄—NH₂+Cl—C—CH₃ →
                       ‖
                       O

U—CH₂—O—C₂H₄—NH—C—CH₃
                 ‖
                 O to give an amide;
(b) with the acid methyl ester of oxalic acid:

U—CH₂—O—C₂H₄—NH₂+HO—C—C—O—CH₃ →
                      ‖ ‖
                      O O

U—CH₂—O—C₂H₄—NH—C—C—OCH₃
                 ‖ ‖
                 O O to give an ester amide.

Similarly, a methylol urea may react with a hydroxy-carboxylic acid (HOR—COOH) with the formation of an ether or ester group the remaining carboxyl, or alcoholic group respectively, being then convertible as set out. In each case the products correspond to the general formula $$H-\left[\begin{array}{c}-N-CH_2-\\ZC-NH-CH_2-O-R_1-X-R_2\end{array}\right]_x-OH$$

in which $x$ is an integral number above 1 and Z denotes oxygen or sulphur, R₁ indicates an alkyl radicle containing at least 2 carbon atoms, in which hydrogen atoms may be substituted by oxygen, ether or ester radicles, and which alkyl radicle R₁ is connected to a hydrocarbon radicle R₂ through X which denotes an ether oxygen atom, a carboxyl group, an amine group or a carboxylic amide group, in which hydrocarbon radicle R₂ hydrogen atoms may be substituted by hydroxyl, ester or ether groups. As pointed out above, phenolates or phenols may be employed but the reaction proceeding with phenols has not been definitely ascertained.

In view of the conversion of the reactive groups still present, as for example by etherification or esterification, it is preferable not to start with the polyhydric alcohols themselves, but with their halogen substitution products. The halogen content of the condensation products freed from solvent may be readily determined and thus the amount of alcoholate to be employed for the etherification or the amount of sodium salt for the esterification may be calculated. If desired, a partial etherification and partial esterification may be performed, so that mixed ether and ester products are obtained, or other kinds of conversion may be effected.

The reaction components may often simultaneously act as solvents when employed in excess and the separation of the excess acting as solvent in the condensation can be effected before the conversion of the reactive groups in the primary products, preferably by precipitation of the condensation product by adding an organic solvent in which the condensation product is insoluble or, when the liquid is sufficiently volatile, by steam distillation.

When the said agent with and in which the condensation is to be carried out is too viscous, it is preferably previously diluted with an inert solvent which contains no free hydroxyl or other reactive groups, as for example dioxane.

The resulting products may be worked up into lacquers or artificial masses, by themselves or in admixture with additional substances, such as cellulose derivatives, natural or artificial resins, softening agents, fillers and colouring materials, or mixtures of these substances in solution or in the solid form.

The following examples will further illustrate the nature of this invention, but the invention is not restricted to these examples. The parts are by weight if not otherwise stated.

Example 1

80 cubic centimeters of a solution in ethyl alcohol of 5 per cent by weight of urea nitrate are added to 1200 grams of ethylene chlorhydrin and heated to 95° C., 800 grams of dimethylol urea then being slowly introduced while stirring, and the whole stirred for a further 20 minutes at 90° C. After cooling the solution, neutralizing with tertiary sodium phosphate and filtering, 5 times its volume of 95 per cent ethyl alcohol is added while stirring vigorously, the condensation product thus separating in a powdery form. It is washed once with ethyl ether and dried in vacuo at a comparatively elevated temperature of between 40° and 50° C. The chlorine content of the product is 9 per cent.

Urea and paraformaldehyde or trioxymethylene may be used as the initial material instead of dimethylol urea.

250 grams of the product precipitated with alcohol are dissolved in 600 grams of ethylene glycol monomethyl ether and 200 grams of the sodium soap of linseed oil fatty acids are added to the solution. The reaction mixture is then heated at about 120° C. for about 12 hours while stirring and the solution is separated from precipitated sodium chloride. The conversion, which is carried out with a quantity of sodium soap slightly exceeding that required for esterification, proceeds practically quantitatively. The small amount of sodium soap still present in the solution is removed by careful neutralization with a few drops of glacial acetic acid the linoleic acid set free being then dissolved in the ether. The condensation product esterified with the linseed oil fatty acids is precipitated by mixing the solution with from 5 to 6 times its volume of ethyl ether. After repeated washing with ethyl ether and drying, a yellow brown resin having an appearance similar to linoxyn is obtained. A solution thereof in ethylene glycol monomethyl ether leaves behind on a substratum after drying a highly lustrous film, which when in thick layers is pale yellow in colour, having great hardness and adhesive power. The solution may also be mixed with solutions of nitrocellulose and these mixtures are suitable for example as a binding medium for priming masses containing fillers. The condensation product probably corresponds to the formula

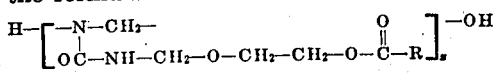

in which formula

is the acid radicle of the linseed oil fatty acids and $x$ is any integral number above 1.

Example 2

200 grams of the solid condensation product having a chlorine content of 9 per cent prepared in ethylene chlorhydrin according to Example 1 are dissolved in 450 grams of ethylene glycol monomethyl ether. 220 grams of a potassium soap of fatty acids of high molecular weight obtainable by treating deresinified crude Montan wax with 200 per cent of its weight of chromic acid according to the U. S. Patent No. 1,737,975 are added to the solution. The reaction mixture is then heated at about 116° C. for about 8 hours while stirring. The solution, while still hot, is separated from the precipitated potassium chloride and the condensation product esterified with the fatty acids is freed from solvent by distillation in vacuo or with steam. The product is a pale yellow substance, which is faintly translucent when in thick layers and which, in contrast to other urea-formaldehyde condensation products, is fusible. The melting point is 80° C. In its outward appearance the product resembles a wax.

The product may be pressed in the warm state into shaped articles with or without the usual additional materials such as asbestos, sawdust, talcum, paper pulp and/or colouring materials. The addition of small amounts of a suitable hardening agent of acid nature such as inorganic or, preferably organic acids, or acid salts or acid esters before pressing, as for example 3 per cent of glycolic acid calculated with reference to the final condensation product, facilitates the hardening of the pressed article. The condensation product probably corresponds to the following formula

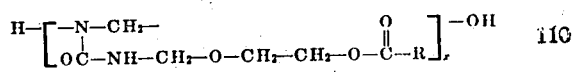

in which formula

is the acid radicle of the montanic acids and $x$ is any integral number above 1.

Example 3

100 parts of adipic 1.1'-diglyceride (prepared by the conversion of the sodium salt of adipic acid with α-monochlorhydrin) are diluted with 40 parts of dioxane, heated to 90° C. and treated with 0.7 part of concentrated hydrochloric acid, 50 parts of dimethylol urea being added then while stirring vigorously. After stirring for half an hour at 90° C., the reaction mixture is neutralized with tertiary sodium phosphate and the condensation product is precipitated from the filtered and cooled solution by mixing therewith 8 times its volume of 95 per cent ethyl alcohol. A tough plastic product is obtained. 6 parts by weight of this product, after drying at from 40° to 50° C., in vacuo and after pulverizing, are suspended in 100 parts by weight of pyridine. 6 parts by weight of benzoyl chloride are added to the suspension and the mixture is stirred while being cooled with ice until the completion of the conversion. The reaction mixture is then poured into water and a pale yellow oil product separates which is washed with water several times. A solution of the product in ethylene glycol monomethyl ether leaves behind on a substratum after drying a colourless firmly adherent film which may subsequently be hardened at elevated temperatures such as from 100° to 120° C. By reason of its high adhesive power the product may advantageously be employed as an adhesive, for example for sticking together strips of paper. The condensation product probably corresponds to the following formula:

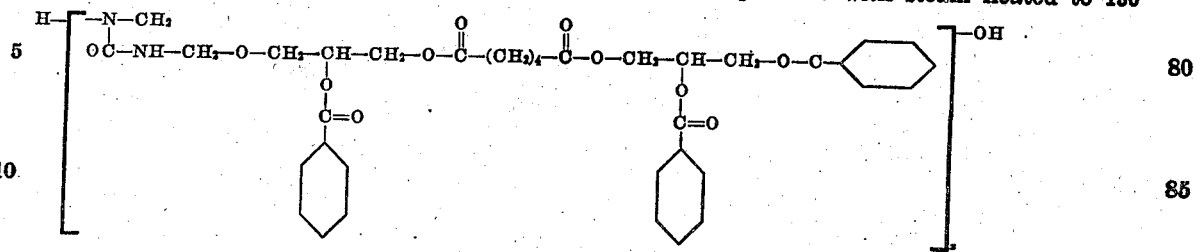

in which $x$ is any integral number abve 1.

Example 4

500 parts of dimethylol urea are added while stirring at 90° C. to 100 parts of alpha-monochlorhydrin together with 1.3 parts of concentrated hydrochloric acid. The reaction mixture is stirred at 90° C. for 30 minutes, whereupon it is neutralized with the aid of tertiary sodium phosphate, the condensation product being then precipitated, after filtering and cooling, in the manner described in Example 3. After drying, 595 parts of a condensation product containing 8.5 per cent of chlorine are obtained. Instead of dimethylol urea, dimethylolthiourea or a mixture of both may be employed.

100 grams of the resulting product are then fused at 80° C. with 100 parts of m-cresol. After cooling to room temperature, 47 parts of phosphorus oxychloride are added while stirring and externally cooling with ice. After the evolution of hydrochloric acid has decreased the reaction product is left standing for a few hours. The tough, syrupy product is then freed from acid by heating it with an aqueous solution of sodium bicarbonate heated to 50° C. and subsequently with water, whereupon remainders of cresol are removed by a treatment with steam. After removing water by drying in vacuo at 100° C., a pale yellowish resinous product is obtained which is soluble in ethyl alcohol, acetone and ethylene glycol monomethyl ether and may be worked into lacquers or priming compositions together with cellulose esters. The condensation product probably corresponds to the following formula

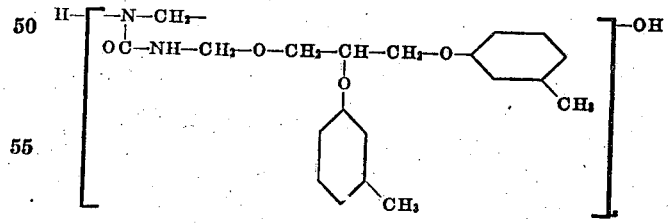

in which $x$ is any integral number above 1.

Example 5

450 parts of glycerine are kneaded together with 5 parts of oxalic acid and 900 parts of dimethylol urea, whereupon the mixture is heated to 100° C. for 2 hours. The resulting hard white mass is then pulverized in a suitable mill. 175 parts of the resulting disintegrated product are then dissolved at 100° C. in 200 parts of distilled commercial cresol, whereupon, after cooling to 80° C., 4.5 parts of phosphorus pentoxide are added while stirring, the temperature rising thereby to 95° C. After stirring at 95° C. for 1 hour the resulting product, which is a tough, syrupy mass after cooling, is washed with hot water until the water shows neutral reaction and is then freed from remainders of cresol by treating it at diminished pressure with steam heated to 130° C. The product is then freed from water by fusing it in vacuo at 110° C. After cooling, a clear, transparent yellow resin is obtained which may be worked into lacquers or primers in conjunction with cellulose esters. The product is soluble in alkali in the same way as the product obtained according to Example 4 and the alkaline solutions of the products may be employed for impregnating or sizing paper, pasteboard and the like. The condensation product probably corresponds to the same formula as the product obtained according to Example 4.

Example 6

117 parts of the solid condensation product containing chlorine described in Example 1 are added to a solution of 47 parts of sodium phenolate in 400 parts of ethylene glycol monomethyl ether, whereupon the mixture is heated for 2 hours at 115° C. The hot solution is separated from sodium chloride formed and the main portion of the glycol ether is distilled off in vacuo. The remaining concentrated solution is then stirred with 6 times its weight of ethyl ether, whereby the reaction product is precipitated. After washing it with ethyl ether and drying in vacuo at 20° C. a brownish resin is obtained, the solution of which in the aforesaid glycol ether furnishes highly glossy, hard and strongly adherent coatings. If desired, the resinous product may be worked into lacquers or primers together with cellulose esters. It differs from the products obtained according to Examples 4 and 5 by its insolubility in alkali.

The condensation product probably corresponds to the following formula

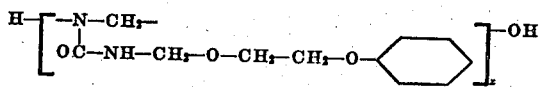

in which $x$ is any integral number above 1.

Example 7

300 parts of dimethylol thiourea are introduced into 300 parts of ethylenechlorhydrin which have been incorporated with 15 parts of a 5 per cent solution of urea nitrate in ethyl alcohol, whereupon the mixture is heated to 85° C. After the reaction, during which the temperature rises to 115° C., has been finished the reaction product is rendered neutral with the aid of caustic soda dissolved in ethyl alcohol, whereupon the condensation product is precipitated from its solution with 6 times by weight of the latter of a mixture of equal parts of ethyl alcohol and acetone, the product being then dried in vacuo at about 20° C.

100 parts of the condensation product containing 12 per cent by weight of chlorine are dissolved in 130 parts of ethylene glycol monomethyl ether, whereupon 80 parts of potash salt of palm kernel fatty acids are added and the whole is stirred for 2½ hours at from 110° to 115° C. The solution is then separated by filtration from potassium chloride formed and the reaction product is precipitated from the solution by incorporating the latter with 6 times its weight of ethyl ether. A yellow resin is obtained which possesses a high adhesive power and may find useful application in joining sheets of paper, the joint sheets possessing a very high electrical insulating power after hardening by heating to from 100° to 110° C. If the dimethylol thiourea be replaced by a mixture of equal quantities of dimethylol thiourea and dimethylol urea a product is obtained which possesses properties similar to those of the product described above. The condensation product probably corresponds to the following formula

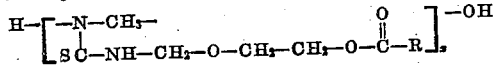

in which

is the acid radicle of the palm kernel fatty acids and $x$ is any integral number above 1.

What we claim is:

1. The process of producing artificial resins which comprises condensing a urea and formaldehyde to a methylol urea in the presence of an organic substance containing a free hydroxyl group and at least one further substituent selected from the class consisting of halogen and hydroxyl, and then acting on the ether thus obtained with an organic compound capable of reacting with the said substituent forming an ester or ether, said compound being selected from the class consisting of metal alcoholates, metal phenolates, metal carboxylates, acid chlorides and acid anhydrides.

2. The process of producing artificial resins which comprises condensing a methylol urea with an organic substance containing a free hydroxyl group and at least one further substituent selected from the class consisting of halogen and hydroxyl, and then acting on the ether thus obtained with an organic compound capable of reacting with the said substituent forming an ester or ether, said compound being selected from the class consisting of metal alcoholates, metal phenolates, metal carboxylates, acid chlorides and acid anhydrides.

3. The process of producing artificial resins which comprises condensing dimethylol urea with an organic substance containing a free hydroxyl group and at least one further substituent selected from the class consisting of halogen and hydroxyl, and then acting on the ether thus obtained with an organic compound capable of reacting with the said substituent forming an ester or ether, said compound being selected from the class consisting of metal alcoholates, metal phenolates, metal carboxylates, acid chlorides and acid anhydrides.

4. Resinous condensation products of a urea and formaldehyde suitable for lacquer preparations, adhesives and for molding shaped articles which are esters or ethers of an ether of a polymerized methylol urea, and obtainable by condensing a urea and formaldehyde in the presence of an organic substance containing a free hydroxyl group and at least one further substituent selected from the class consisting of halogen and hydroxyl, and then acting on the ether thus obtained with an organic compound capable of reacting with the said substituent forming an ester or ether, said compound being selected from the class consisting of metal alcoholates, metal phenolates, metal carboxylates, acid chlorides and acid anhydrides.

5. Resinous condensation products of a urea and formaldehyde suitable for lacquer preparations, adhesives and for molding shaped articles which are esters or ethers of an ether of a polymerized methylol urea, and obtainable by condensing a methylol urea with an organic substance containing a free hydroxyl group and at least one further substituent selected from the class consisting of halogen and hydroxyl, and then acting on the ether thus obtained with an organic compound capable of reacting with the said substituent forming an ester or ether, said compound being selected from the class consisting of metal alcoholates, metal phenolates, metal carboxylates, acid chlorides and acid anhydrides.

6. Resinous condensation products of a urea and formaldehyde suitable for lacquer preparations, adhesives and for molding shaped articles which are esters or ethers of an ether of a polymerized methylol urea, and obtainable by condensing dimethylol urea with an organic substance containing a free hydroxyl group and at least one further substituent selected from the class consisting of halogen and hydroxyl, and then acting on the ether thus obtained with an organic compound capable of reacting with the said substituent forming an ester or ether, said compound being selected from the class consisting of metal alcoholates, metal phenolates, metal carboxylates, acid chlorides and acid anhydrides.

WILHELM PUNGS.
KARL EISENMANN.
ERICH SCHOLZ.
THEODOR KOLLMANN.